(12) United States Patent
Zhang et al.

(10) Patent No.: US 9,590,739 B2
(45) Date of Patent: Mar. 7, 2017

(54) HIGH ELECTRON MOBILITY TRANSISTOR-BASED TERAHERTZ WAVE SPACE EXTERNAL MODULATOR

(71) Applicant: UNIVERSITY OF ELECTRONIC SCIENCE AND TECHNOLOGY OF CHINA, Chengdu (CN)

(72) Inventors: Yaxin Zhang, Chengdu (CN); Shen Qiao, Chengdu (CN); Shixiong Liang, Chengdu (CN); Ziqiang Yang, Chengdu (CN); Zhihong Feng, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 14/892,578

(22) PCT Filed: May 20, 2014

(86) PCT No.: PCT/CN2014/000512
§ 371 (c)(1),
(2) Date: Mar. 30, 2016

(87) PCT Pub. No.: WO2014/187150
PCT Pub. Date: Nov. 27, 2014

(65) Prior Publication Data
US 2016/0233962 A1   Aug. 11, 2016

(30) Foreign Application Priority Data

May 20, 2013  (CN) .......................... 2013 1 0187521
May 24, 2013  (CN) .......................... 2013 1 0198600

(51) Int. Cl.
*H01L 29/66*   (2006.01)
*H04B 10/516*  (2013.01)
(Continued)

(52) U.S. Cl.
CPC ......... *H04B 10/516* (2013.01); *H04B 10/501* (2013.01); *H04B 10/90* (2013.01)

(58) Field of Classification Search
CPC . H01L 29/66462; H03K 17/79; H04B 10/501
(Continued)

(56) References Cited

U.S. PATENT DOCUMENTS 9,083,257 B2 *   7/2015  Tateno ..................... H02M 1/38
2006/0141682 A1*  6/2006  Taylor .................... H01L 29/155
                                                       438/142
(Continued)

FOREIGN PATENT DOCUMENTS

CN    102279476 A   12/2011
CN    103034014 A    4/2013
CN    103346406 A   10/2013

OTHER PUBLICATIONS

David Shrekenhamer et al: "High speed terahertz modulation, from metamaterials with embedded high electron mobility transistors", Optics Express, vol. 19, No. 10, May 9, 2011, pp. 1-8.
(Continued)

*Primary Examiner* — Don N Vo
(74) *Attorney, Agent, or Firm* — Gokalp Bayramoglu

(57) ABSTRACT

Terahertz external modulator based on high electron mobility transistors belongs to the field of electromagnetic functional devices technology. This invention includes the semiconductor substrate (1), the epitaxial layer (2), and the modulation-unit array (4). The epitaxial layer (2) is set on the semiconductor substrate (1). The modulation-unit (4), the positive electrode (3), and the negative electrode (5) are all set on the epitaxial layer (2). The modulation-unit array includes at least three units with each of them is composed of high electron mobility transistors and metamaterial-structure. The gates of transistors connect to the negative electrode (5), and the sources and drains connect to the positive
(Continued)

electrode (3). This invention is used for manipulation of spatial transmission terahertz waves. It could be operated at room temperatures, normal pressures, and non-vacuum condition. It does not need to load on the waveguide, thus is easy to package and use.

5 Claims, 5 Drawing Sheets

(51) Int. Cl.
*H04B 10/90* (2013.01)
*H04B 10/50* (2013.01)

(58) Field of Classification Search
USPC .................................................. 398/183
See application file for complete search history.

(56) References Cited

U.S. PATENT DOCUMENTS

| | | | |
|---|---|---|---|
| 2009/0315017 A1* | 12/2009 | Song | B82Y 10/00 257/24 |
| 2013/0049814 A1* | 2/2013 | De Rooij | H01L 27/0207 327/108 |
| 2014/0084347 A1* | 3/2014 | Salcedo | H01L 21/8252 257/195 |

OTHER PUBLICATIONS

Saroj Rout et al: "Embedded HEMT/Metamaterial Composite Devices for Active Terahertz modulation", Photonics Society, 2010 23rd Annual Meeting of the IEEE, Nov. 11, 2010, pp. 1-6.
Taiichi Otsuji: "Study on Active Terahertz Metamaterials", Apr. 1, 2011, pp. 1-4.

* cited by examiner

HIGH ELECTRON MOBILITY TRANSISTOR-BASED TERAHERTZ WAVE SPACE EXTERNAL MODULATOR

TECHNICAL FIELD

The invention belongs to the field of electromagnetic functional device technology, focusing on the quickly dynamic functional device for terahertz band, including terahertz modulators, detectors, sensors, and so on.

BACKGROUND TECHNIQUE

Terahertz radiation (0.1 to 10 THz; 1 THz=$10^{12}$ Hz) is situated between infrared light and microwave radiation. Terahertz (THz) science and technology is rapidly becoming a notable area of scientific research for potential applications in security, wireless communication, imaging and other areas.

As one of the most important applications in terahertz area, THz wireless communication currently subject to the attention of the world. A THz communication system has unique advantages compared to microwave and optical fiber communications. THz can support ultrahigh bandwidth spread spectrum systems, which can enable secure communication, large capacity networks, and so on. Moreover, compared to free-space infrared systems, a THz communication system has much better performance under certain atmospheric conditions (e.g., fog).

As one of the most key components of the THz communication system, a THz dynamic functional device (terahertz external modulator) has become the focus of research in the field of THz science and technology. Since terahertz band function devices require size in micron or nanometer scale, which means microwave and infrared band devices cannot be applied directly. Therefore, since 2004, Nature/Science and the top international scientific journals have published many articles about terahertz external modulators.

Researchers have tried many ways to realize the THz modulator, such as combining the Si, GaAs, phase-transition, Graphene material systems with the metamaterial. By applying the external laser, voltage and temperature changes to induce the electromagnetic characteristic change of the resonance of modulator to dynamic control the THz wave. However, until now there has been a lack of effective THz modulators which achieve fast and efficient modulation.

In recent years, with the development of semiconductor materials and technology, High Electron Mobility Transistor (HEMT) have shown excellent performance, and have been successfully applied to detectors, amplifiers, and other areas. The development of the HEMT provides new ways for the rapid response dynamic terahertz device.

HEMT is a device which applies the two dimensional electrons gas (2-DEG) to construct the transistor and has a resonance response to electromagnetic radiation at the plasma oscillation frequencies. This response can be used for new types of detectors, mixers, and multipliers. These devices should operate at much higher frequencies than conventional, transit-time limited devices, since the plasma waves propagate much faster than electrons. In 1978, R. Dingle firstly observed high electron mobility in the doped GaAs/AlGaAs super-lattices which are produced by molecular beam epitaxy (MBE). In 1980, Fujitsu developed a HEMT and successfully used it in low noise amplifier. As the third generation of wide bandgap semiconductor material GaN has not only wide band gap, but also has a large thermal conductivity, high electron saturation rate, strong breakdown field and good thermal stability, etc. Therefore, in the preparation of the high-speed dynamic devices, HEMT GaN-based material has great advantages.

Metamaterial is a kind of artificial electromagnetic array structure, which is made from assemblies of specific geometry resonance units with periodic or aperiodic patterns. The artificial designed structures gives them their smart properties capable of manipulating electromagnetic waves to achieve benefits that go beyond what is possible with conventional materials. With the development of modern micro-fabrication techniques, metamaterials played a huge role in the development of passive functional devices, and have developed a variety of related functions devices in millimeter wave, THz, and optical band.

SUMMARY OF THE INVENTION

The technical problem to be solved by this present invention is to provide a modulator that can quickly and dynamically control the spatially transmitted terahertz waves by applying a voltage signal, which can effectively and quickly modulate the amplitude of the spatially transmitted terahertz waves based on design frequency.

The novel solution to the technical problem presented in this invention is combining the HEMT and Metamaterial structure together. By utilizing the high-speed dynamic characteristics of the HEMT and the Metamaterials' accurate controlling ability for electromagnetic wave controlling ability, after the process of design, simulation, optimization and processing, a THz modulator with reliable performance can be obtained. This invention of the modulator comprises a semiconductor substrate, a epitaxal layer, a modulation-unit array, a positive electrode pad and a negative electrode pad. The epitaxial layer is set on the semiconductor substrate. The modulation-unit, positive electrode pad, and the negative electrode pad are all set on the epitaxial layer.

The modulation-unit array comprises at least three modulation-units.

The modulation-unit comprises a high electron mobility transistor (HEMT) and a metamaterial structure. The gates of the transistors connect to the negative electrode pad, and the sources and drains connect to the positive electrode pad.

Moreover, the positive electrode pad comprises source ports and drain ports which are respectively connected to the sources and drains of the transistors.

The modulation-unit array is composed of M*N units (M>3, N>3).

Each transistor comprises a source, gate, drain, and heterostructure.

Each unit of the Metamaterials resonant structure comprises a gate connector, a source resonator and a drain resonator. The source resonator and the drain resonator are symmetrically located with each other.

The source resonator is constructed by the horizontally located long and short metal wires together with the vertical metal wire. The long metal wire connect neighboring units with itself and the short metal wire is set on the source electrode of the transistor.

The drain resonator is constructed by the horizontally located long and short metal wires together with the vertical metal wire. The long metal wire connect neighboring units with itself and the short metal wire is set on the drain electrode of the transistor.

The horizontal gate connector connects the gate which is in the center of the unit.

The semiconductor substrates are usually the sapphire, high-resistivity silicon, quartz or SiC; the epitaxial layers are usually made of AlGaN/GaN, InGaN/GaN, AlGaAs/GaAs, AlGaAs/InGaAs, or AlGaAs/InGaAs/InP.

For each row of the modulation unit array, the long source metal wire of the modulation unit connects with each other to form a straight line which connects to the positive electrode pad; wherein the long drain metal wire of each modulation unit connects with each other to form a straight line which connects to the positive electrode pad; wherein the gate connector of each modulation unit connects with each other to form a straight line which connects with the negative electrode.

The highlights of the present invention are (1) As a fast response component, the HEMT which acts as the core dynamic functional part of this invention has been combined with the metamaterial structure to realize the fast modulation of THz wave.

(2) Each metamaterial unit structure of this invention only consists of two plates butted together with a split gap and three electrodes, which can reduce the resistor-capacitor (RC) parameters and simplify fabrication. This design is a two-dimension planar structure which is easier to fabricate by utilizing the micro-fabrication technique compared with the three-dimension structure fabricated by the machining technology.

(3) This invention is controlled by electric voltage signal instead of the external induced light, temperature and other excitation. Moreover, the voltage is only several volts (in general smaller than 7V), which has the advantage in the on-chip device, the practical production and so on.

(4) The design of this invention has relative high flexibility and controllability. This device can be used for the THz wave beams with different beam-size by adjusting the number of units.

(5) In this structure of the invention, by applying voltage on the HEMT we can realize a resonant mode conversion between two different modes. Such mode conversion significantly improves the modulation speed and depth, and can realize double frequencies-working and frequency shift. Specifically, this invention provides a stronger resonant frequency of the structure, more effective modulation, a more simplified structure than existing technology, a smaller RC constant, and a faster modulation rate. These features can be very helpful in advancing modulation technology for terahertz band double frequency and the frequency blueshift component.

(6) This invention can make the source and drain separately by the air bridge in microelectronics, which can achieve the multifunction modulation.

(7) The device of this invention is used for the spatial transmission of THz waves, which can work at room temperature, atmospheric pressure, non-vacuum conditions without loading the waveguide, and can be easy to package.

DETAILED DESCRIPTION OF THE INVENTION

Figure 1:
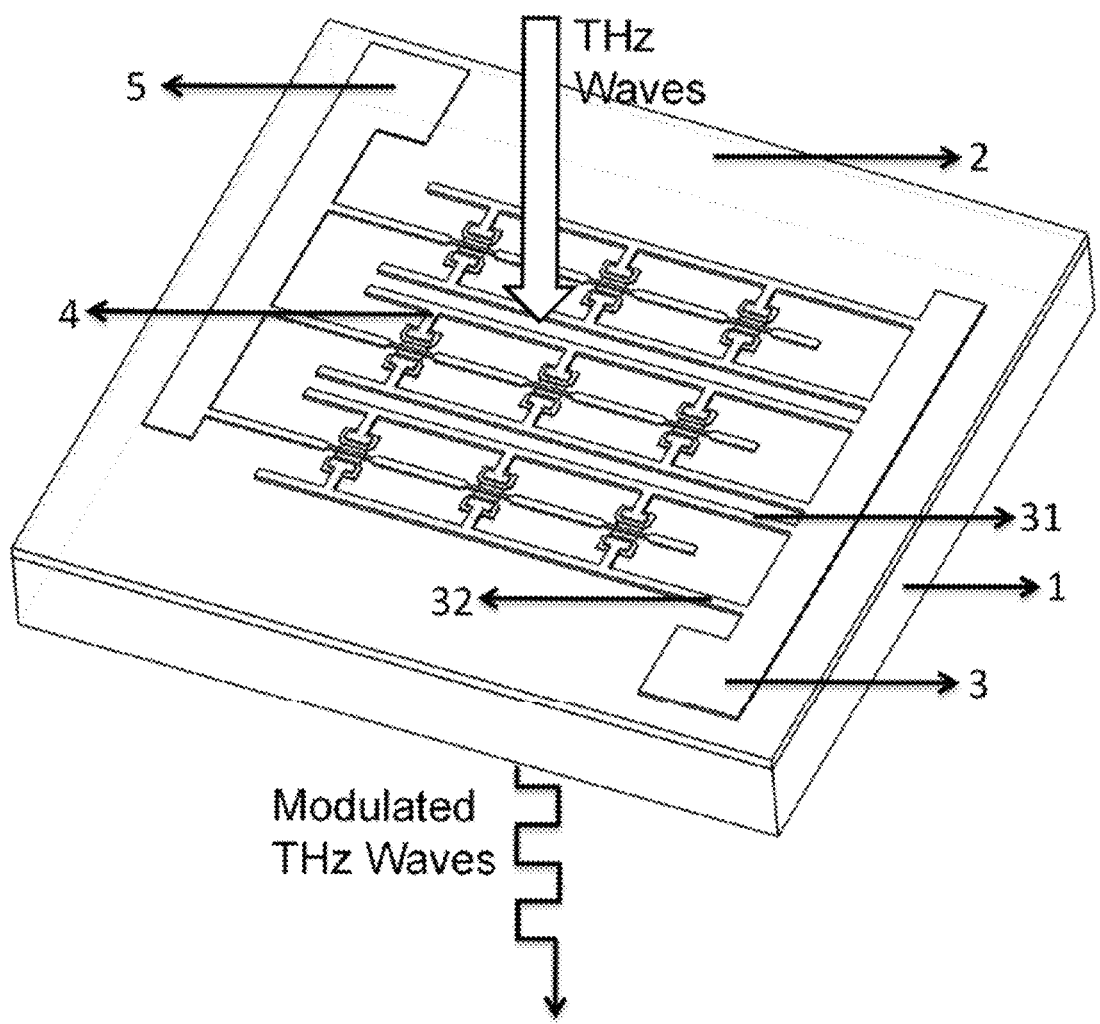
FIG. 1 is the overall design of the HEMT modulator.

This invention presents a THz modulator comprising a HEMT and metamaterial structure together. This type of modulator takes advantage of the high mobility characteristics of 2-DEG in the HEMT and the electromagnetic wave resonance characteristics of the metamaterial structure. Based on the simulation and experimental study results, it shows that such modulator can achieve rapid dynamic modulation of the terahertz wave which transmitting in the free space. Moreover, this modulator has simple structure, high modulation and easy manipulation.

The terahertz external modulator based on high electron mobility transistors mainly comprises several components: the semiconductor substrate (1), the epitaxial layer (2), the modulation-unit array (4) and positive electrodes pad (3) and negative electrode pad (5). The epitaxial layer (2) is set on the semiconductor substrate (1). The modulation-unit (4), the positive electrode pad (3), and the negative electrode (5) are all set on the epitaxial layer (2).

The modulation-unit array comprises at least three modulation-units.

The modulation-unit is composed of high electron mobility transistors (HEMT) and metamaterial structure. The gates of HEMT connect to the negative electrode pad (5), and the sources and drains connect to the positive electrode pad (3).

The positive electrode pad (3) stated above comprises the source ports (31) and the drain ports (32) which connects to each unit. Moreover, the source ports (31) and the drain ports (32) can be also connected to two different voltages to realize the control of the source and drain separately.

The modulation-unit array is composed of M*N units (M>3, N>3).

Figure 2A:
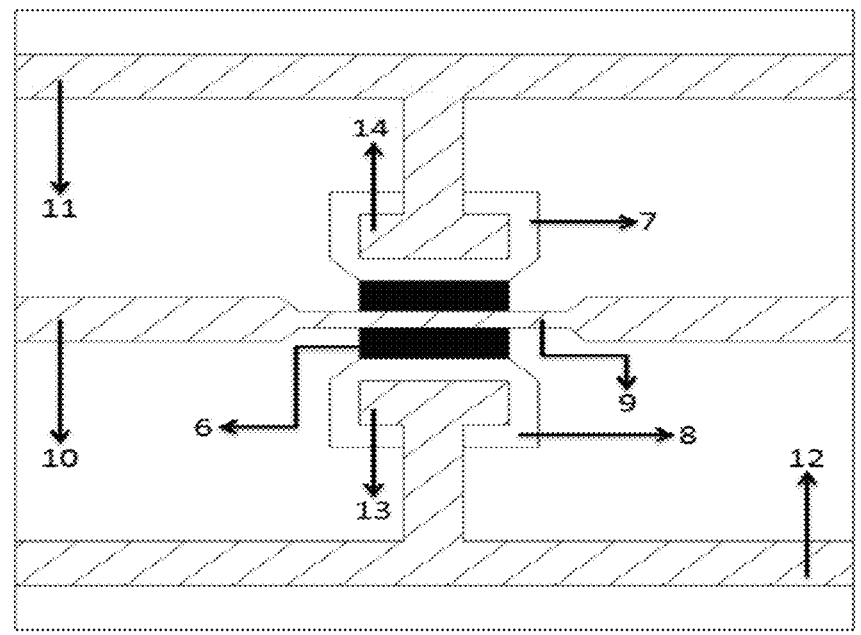
FIG. 2A is the 2D plan view of the nodulation unit of HEMT modulator.

Each transistor comprises a source (7), gate (9), drain (8), and heterostructure structure (6);

The metamaterial structure composed of the gate connector (10), the source resonator, and the drain resonator. The source resonator and the drain resonator are vertically symmetrical with each other. In other words, the integrity of the combined source resonator and drain resonator is a vertically symmetrical figure, wherein the upper part is the source resonator and the lower part is the drain resonator; or alternately the upper part could be the drain resonator and the lower part could be the source resonator, as shown in FIG. 2A.

The source resonator comprises three parts: the horizontal long source metal wire 11, the short source metal wire 14, and the vertical source metal wire. The vertical source metal wire connects with the long source metal wire 11 and the short source metal wire 14 separately The long source metal wire 11 connects neighboring units with itself and the short metal wire 14 is just set on the source electrode of the transistor.

The drain resonator comprises the horizontal long drain metal wire 12, the short drain metal wire 13, and the vertical drain metal wire. The vertical drain metal wire connects the long drain metal wire 12 and the short drain metal wire 13 separately. The long drain metal wire 12 connects with neighbor units with itself and the short metal wire 13 is set on the drain electrode of the transistor.

The horizontal gate connector (10) is connected with the gate located in the center of the unit.

The drain and source resonators all comprises the horizontal long metal wires, short metal wires, and the vertical metal wire. The structure above is referred to as a I-shape resonator.

Moreover, for each unit, the vertical long metal wire connects with the middle position of the horizontal long metal wire and short metal wire.

Figure 2B:
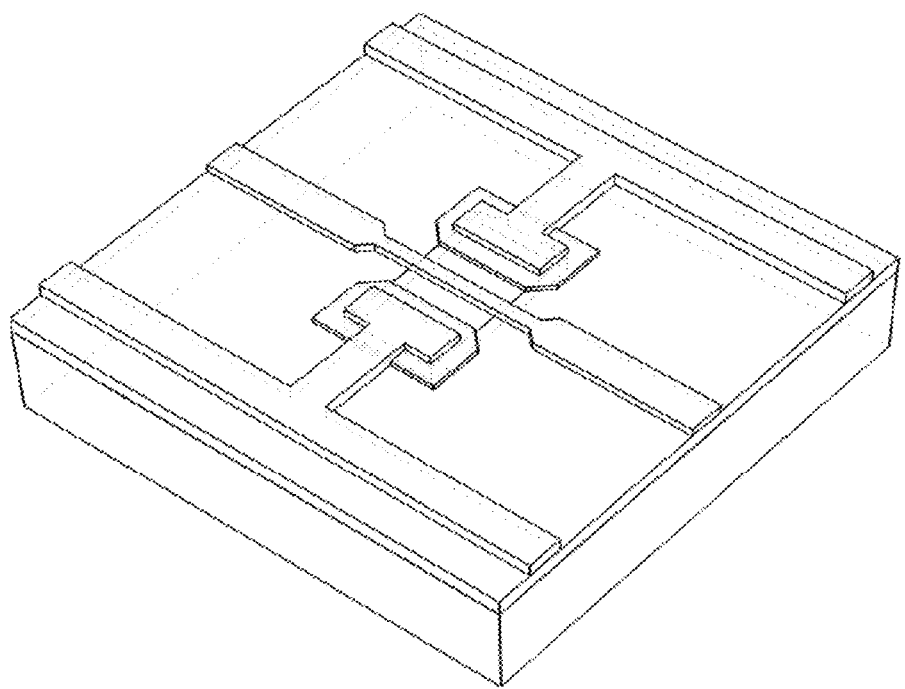
FIG. 2B is the perspective view of the modulation unit of HEMT modulator.

In detail, the THz modulator based on the high electron mobility transistor is a metal-semiconductor composite structure which contains is combined by the metamaterials structure and HEMT. As shown in FIG. 1, it comprises a sapphire substrate, HEMT epitaxial layer, periodic metal artificial resonant cell structure, and the alignment circuit. There are two steps in the preparation process of HEMT epitaxial layer preparation process. Firstly, we could use ion implantation or etching to form the periodically arranged isolation area, then we make the source and drain ohmic contact electrodes and gate schottky contact electrode to form the HEMT array. Finally, we align the I-shaped metamaterial, the gate connecting line, and the external circuit on the top of the transistor, then the integrated modulation device is formed. The line width for each resonant unit is 200~500 mm. The I-shaped structure is vertically symmetrical. As shown in FIG. 2A and FIG. 2B, the long sides for all elements linked together constitute the controlling circuit of the source and drain. This control circuit connects with positive electrode pad. The short side is located in the center of unit and be aligned in the top of sources and drains. All gate connecting wires linked together constitute the controlling circuit of the gate, which finally connects to the positive voltage electrode.

In the above technical solution, the substrate could be sapphire, high-resistivity silicon, SiC, and so on; the epitaxial layer of the HEMT could be AlGaN/GaN, InGaN/GaN, AlGaAs/GaAs, AlGaAs/InGaAs, AlGaAs/InGaAs/InP, and so on. The materials of the metal electrode are generally Ti, Al, Ni, Au and other metals with similar characteristics; the alignment circuit may be Au, Ag, Cu, Al and other metal materials.

Figure 4:
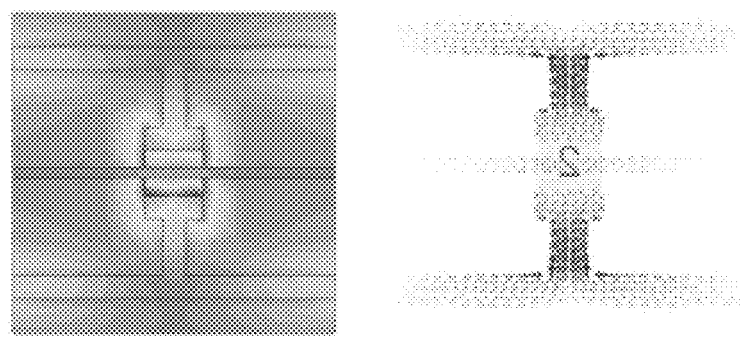
FIG. 4 is the surface electric field and current distribution schematic view when voltage is applied.

The concentration of 2-DEGs controlled by voltages in the HEMT is the key to modulate terahertz waves. More specifically, negative voltage is applied to the negative voltage electrode pad (5) which linked with gate, and positive voltage is applied to the positive electrode pad (3) which linked with source and drain. When voltage difference locates between 4~10V, as shown in FIG. 4, the 2-DEGs depletion in the split gap separate the source and drain, a dipolar resonance is induced on the short cut wires. The I-shaped structures work independently. The surface current distribution indicates that the current oscillating on short cut wires with the field focused on the central split gap and the resonant frequency of the structure is 1.31 THz. When the voltage is 0V, the source and drain in this structural unit are connected by the 10 nm-thick 2-DEG of the heterostructure so that the induced THz wave will excite a dipolar resonance in the long central wire. The resonance induced by the incident THz waves arises from the equivalent collective dipolar resonance in the long, central wire with fields focused at the edge of each unit cell. The resonant frequency of the structure is 0.56 THz. Therefore, there will be a frequency shift that could modulate the amplitude at a certain frequency. The superior nano 2-DEG performance in the heterostructure and high dipolar resonant intensity allow this modulator to achieve a high modulation speed.

In the FIG. 4, changes in carrier concentration Ns represent distribution changes in the 2-DEG which is caused by voltages.

As a more specific example, the space terahertz modulator based on high electron mobility transistor, as shown in FIG. 2A and FIG. 2B, comprises sapphire substrate, HEMT epitaxial layer, Periodic metal artificial resonant cell structure, and the socket circuit. The HEMT epitaxial layer was etched into a cycle of independent action area, then source and drain ohmic contact electrode is aligned on the action area. The gate and the active region together form a schottky contact. The depleted HEMT contains gate, source, drain, and HEMT epitaxial layer. Then I-shaped metamaterials, gate lines and external circuits are aligned on the top of transistors. Each resonator element is constituted by metal film lines. The I-shaped structure is vertically symmetrical. All elements of the long side linked together constitute the controlling circuit of the source and drain. This controlling circuit connects with positive electrode 3. The short side is aligned on the top of source and drain. The gate between two short sides and the HEMT epitaxial layer together formed a schottky contact. All the gates connect with each other, thus constitute the controlling circuit of the grid. This controlling circuit connects with positive electrode 5.

The substrate above is a 400 um sapphire, which has a good transmission of THz waves. It can be further improved after reducing the thickness. AlGaN/GaN epitaxial layer can be prepared by hydride vapor phase epitaxy (HVPE), metalorganic vapor phase epitaxy (MOCVD), and molecular beam epitaxy (MBE). Then the dry etching or ion implantation isolation is used to etch AlGaN/GaN epitaxial layer to form the isolation area. On the isolation area, we can make source, gate and drain by electron beam evaporation or magnetron sputtering. After lithography and reactive ion etching the ohmic contact window is realized by the SiN mask. The sample is put into a magnetron sputtering equipment to make Ti(20 nm)/Al(120 nm)/Ni(40 nm)/Au(50 nm) films. Then contact electrodes are formed after peeling. The ohmic contacts are achieved by flash annealing under nitrogen atmosphere. The gate is made by Ni which has a great adhesion as the underlying metal, and then covered with a layer of Au to protect from oxidation. Finally, the metamaterials are aligned on the completed HEMT array. The dynamic amplitude modulation of normal incident THz waves is realized by the voltages between two pads.

Figure 3:
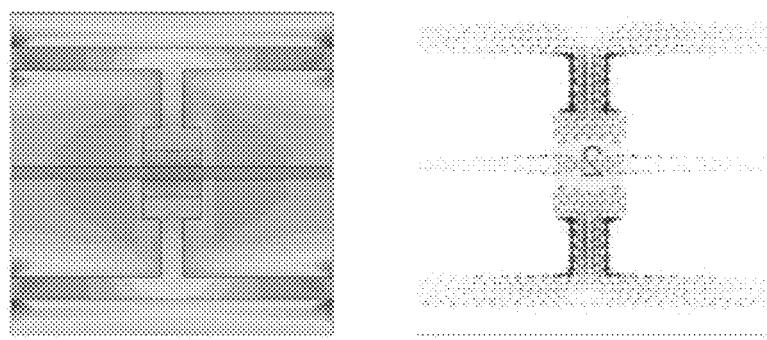
FIG. 3 is the surface electric field and current distribution schematic view when no voltage is applied.
Figure 5:
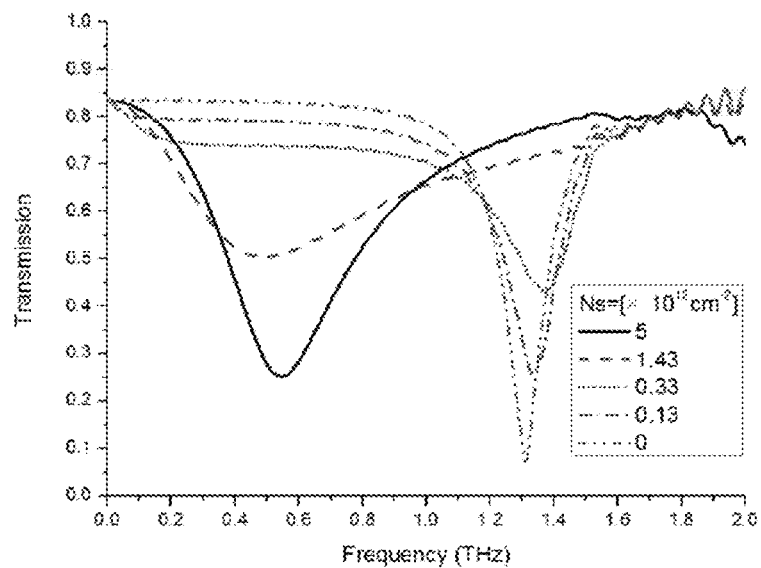
FIG. 5 is the transmission spectrum curves of HEMT modulator which depends on the carrier concentration Ns.

Three-dimensional electromagnetic simulation software proves the feasibility of the HEMT spatial terahertz modulator. FIG. 3 is transmission results and FIG. 4 is resonant modes simulated by electromagnetic simulation. The results show that the changes of the concentration in 2-DEGs caused by voltages will lead to mode conversion of the device, resulting in resonant frequency peak shift and the modulation of THz waves. FIG. 5 is the transmittance spectrum depending on the changes of voltages. In FIG. 5, Ns corresponds to the density of two-dimensional electron gas (2-DEG) of HEMT in this modulator with different voltages. FIG. 5 indicates that such resonance mode conversions controlled by the external voltage caused a large resonant frequency shift. The frequency of voltage-off resonant mode is 0.56 THz while 1.31 THz corresponding to the voltage-on mode. Such frequency shifts lead to a transmission difference which is proposed to realize dynamic modulation of the THz wave in this invention. The simulation results in the transmittance spectrum in FIG. 5 show that at the 0.56 THz working frequency the voltage-on and off status-switch result in a THz wave transmittance change from 25% to 84%. Moreover, at the 1.31 THz, the voltage on-off status switch could lead to 80% to 5% transmittance change. These results clearly demonstrated that this THz modulator can modulate the spatial transmitted THz wave at two different frequencies with relative high modulation depth.

Figure 6:
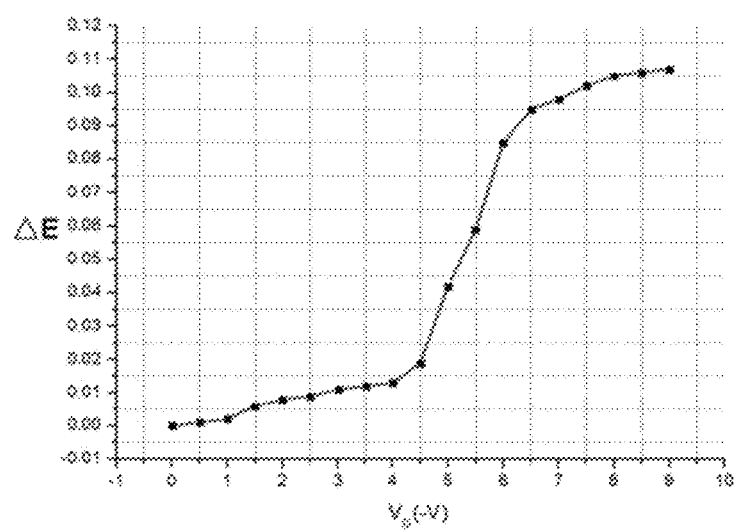
FIG. 6 is the experiment result of spaced THz wave modulation amplitude measured at different voltages.
Figure 7:
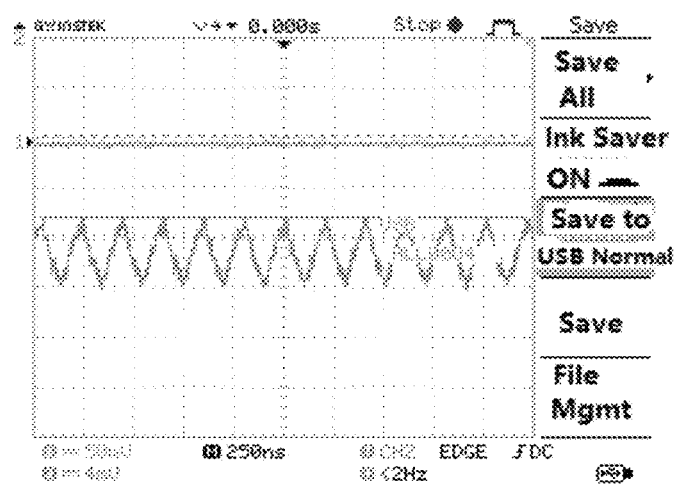
FIG. 7 is the real-time dynamic experimental results of modulating a continuous THz wave with a modulation speed of 5 MHz.

The experimental results of the modulator are shown in FIG. 6 and FIG. 7. FIG. 6 shows the transmission power change at different voltages. The transmission power change keeps increasing to around 4.5V and becomes stable around 7V, which indicates this modulator has an obvious response to the voltage. Moreover, the 2-DEGs in the HEMT trend to be depleted with the increasing of voltages, results in the change of resonant modes, which will finally affect the transmission amplitudes. The 5 Mbps modulated signals loading on the terahertz waves are shown in FIG. 7, which indicates that this modulator could be operated at a high speed. Consequently, this terahertz modulator based on HEMT is a high speed electronic controlling devices. It will provide some ideas and directions for the design and fabrication of terahertz functional devices.

The invention claimed is:

1. A terahertz external modulator based on high electron mobility transistors (HEMT) comprising: a semiconductor substrate, an epitaxial layer, and a modulation unit array; wherein the epitaxial layer is set on the semiconductor substrate; wherein the modulation unit array, at least one positive electrode, and at least one negative electrode are set on the epitaxial layer;
    wherein the modulation unit comprises at least one at least three modulation-units;
    wherein the modulation unit comprises at least one HEMT and at least one metamaterial structure; each of the HEMT comprises a gate, a source, a drain and heterostructure structure; wherein the gate of the HEMT connects to the negative electrode, and the source and drain connect to the positive electrode;
    wherein the metamaterial structure composed of a gate connector, a source resonator, and a drain resonator; the source resonator and the drain resonator are symmetrical with each other;
    wherein the source resonator comprises three parts: a horizontal long source metal wire, a horizontal short source metal wire and a vertical source metal wire; wherein the vertical source metal wire connects with the long source metal wire and the short source metal wire separately; wherein the long source metal wire connects with another long source metal wire in the adjacent modulation unit and the short source metal wire is set on the source of the HEMT;
    wherein the drain resonator comprises a horizontal long drain metal wire, a horizontal short drain metal wire, and a vertical drain metal wire; wherein the vertical drain metal wire connects the long drain metal wire and the short drain metal wire separately; wherein the lone drain metal wire connects with another long drain metal wire in the adjacent modulation unit wherein the short drain metal wire is set on the drain electrode of the HEMT;
    wherein the horizontal gate connector is connected with the gate which is in the center of the modulation unit; wherein the horizontal gate connector also connects to another gate connector in the adjacent modulation unit.

2. The terahertz external modulator according to claim 1, wherein the positive electrode comprises at least one source port and at least one drain port which are respectively connected to source and drain of the HEMT.

3. The terahertz external modulator according to claim 1, wherein the modulation unit array is composed of M*N units (M>3, N>3).

4. The terahertz external modulator according to claim 1, wherein the semiconductor substrates are selected from a group consisting of: sapphire, quartz, the high-resistivity silicon, or the SiC;
    wherein the component of the epitaxial layers is selected from a group consisting of: AlGaN/GaN, InGaN/GaN, AlGaAs/GaAs, AlGaAs/InGaAs, or AlGaAs/InGaAs/InP.

5. The terahertz external modulator according to claim 1, wherein the modulation unit array is composed of M*N units (M>3, N>3);
    wherein for each row of the modulation unit array, the long source metal wire of the modulation unit connects with each other to form a straight line which connects to the positive electrode pad; wherein the long drain metal wire of each modulation unit connects with each other to form a straight line which connects to the positive electrode pad; wherein the gate connector of each modulation unit connects with each other to form a straight line which connects with the negative electrode pad.

* * * * *